(12) United States Patent
Nishioka

(10) Patent No.: US 12,424,674 B2
(45) Date of Patent: Sep. 23, 2025

(54) BATTERY FAILURE DETERMINATION DEVICE

(71) Applicant: TOYOTA JIDOSHA KABUSHIKI KAISHA, Toyota (JP)

(72) Inventor: Kosuke Nishioka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 110 days.

(21) Appl. No.: 18/418,652

(22) Filed: Jan. 22, 2024

(65) Prior Publication Data

US 2024/0297355 A1 Sep. 5, 2024

(30) Foreign Application Priority Data

Mar. 1, 2023 (JP) ................. 2023-030676

(51) Int. Cl.
*H01M 10/00* (2006.01)
*G07C 5/08* (2006.01)
*H01M 10/42* (2006.01)

(52) U.S. Cl.
CPC ...... *H01M 10/4285* (2013.01); *G07C 5/0808* (2013.01)

(58) Field of Classification Search
CPC .................. H01M 10/4285; G07C 5/0808
USPC ....................................... 701/32.8
See application file for complete search history.

(56) References Cited

FOREIGN PATENT DOCUMENTS

| JP | H07-248861 A | 9/1995 |
| JP | 2016-528870 A | 9/2016 |
| JP | 6414460 B2 * | 10/2018 |

* cited by examiner

*Primary Examiner* — Tiffany P Young
(74) *Attorney, Agent, or Firm* — SoraIP, Inc.

(57) ABSTRACT

A battery failure determination device that determines a failure of a second battery based on presence or absence of an electric discharge from the second battery when an output voltage of a DCDC converter is temporarily lowered in a power source circuit in which electric power is supplied to a load by the second battery and in which electric power is supplied to the load by a voltage stepped down or boosted by the DCDC converter from a first battery, and a cycle of temporarily lowering the output voltage of the DCDC converter is irregular.

2 Claims, 3 Drawing Sheets

BATTERY FAILURE DETERMINATION DEVICE

CROSS-REFERENCE TO RELATED APPLICATION

This application claims priority to Japanese Patent Application No. 2023-030676 filed on Mar. 1, 2023 incorporated herein by reference in its entirety.

BACKGROUND

1. Technical Field

The present disclosure relates to a battery failure determination device, and more particularly, to a determination cycle.

2. Description of Related Art

A vehicle may have an autonomous driving function. The vehicle includes a power source circuit that supplies electric power to a load of a steering device at the time of autonomous driving, a control device that controls autonomous driving, etc. In the power source circuit, the voltage is boosted by a DCDC converter from a lead battery to supply electric power to the load, and electric power is supplied to the same load by a lithium battery.

Japanese Unexamined Patent Application Publication (Translation of PCT application) No. 2016-528870 (JP 2016-528870 A) discloses a technique for determining a failure of a lithium battery based on the presence or absence of an electric discharge from the lithium battery when an output voltage of a DCDC converter is temporarily lowered in the power source circuit.

SUMMARY

However, the output voltage of the DCDC converter cannot completely follow a load fluctuation of a noise, a disturbance, etc. Therefore, when the load fluctuation is generated when the output voltage of the DCDC converter is lowered, the electric discharge from the lithium battery will also be fluctuated. This may occur erroneous determination of the failure of the lithium battery.

In the failure determination disclosed in JP 2016-528870 A, the output voltage of the DCDC converter is temporarily lowered at a constant cycle. Here, when a load or a sensor operating at a constant cycle exists in the power source circuit, a noise is generated at the cycle. Therefore, when the cycle of temporarily lowering the output voltage of the DCDC converter and the cycle of the load fluctuation are substantially synchronized in the failure determination, the electric discharge from the lithium battery also fluctuates for each determination. This may lead to erroneous determination of the failure of the lithium battery.

Therefore, an object of the present disclosure is to provide a battery failure determination device that can avoid erroneous determination.

A battery failure determination device according to the present disclosure is a battery failure determination device that determines a failure of a battery based on presence or absence of an electric discharge from the battery when an output voltage of a DCDC converter is temporarily lowered in a circuit in which electric power is supplied to a load by the battery and in which electric power is supplied to the load by a voltage stepped down or boosted by the DCDC converter from a power source different from the battery, and that is characterized by a cycle of temporarily lowering the output voltage of the DCDC converter being irregular.

With the above configuration, erroneous determination can be avoided.

In the present disclosure, one of the cycles is preferably determined using a battery temperature detected by a battery temperature sensor.

According to the above configuration, the cycle is calculated by using a detection value of the battery temperature sensor in which a noise such as a disturbance is likely to be included. As a result, an irregular cycle can be reliably calculated.

According to the battery failure determination device of the present disclosure, erroneous determination can be avoided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
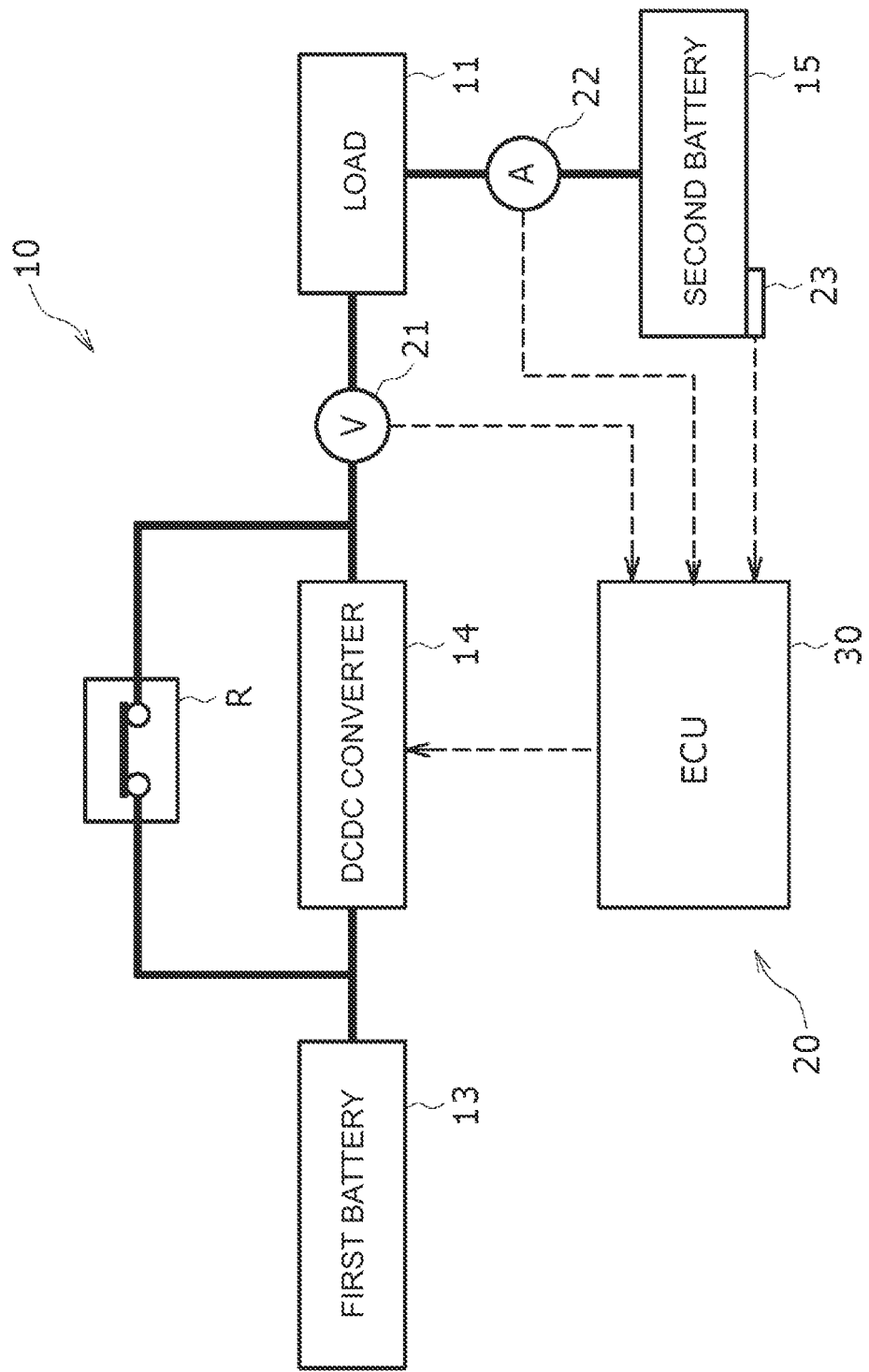
FIG. 1 is a circuit diagram illustrating a power source circuit according to an embodiment.

Hereinafter, an example of an embodiment of the present disclosure will be described in detail. In the following description, specific shapes, materials, directions, numerical values, and the like are examples for facilitating understanding of the present disclosure, and can be appropriately changed in accordance with applications, purposes, specifications, and the like.

The battery failure determination device 20 determines a failure of the second battery 15 provided in the power source circuit 10 that supplies electric power to the load 11 of the vehicle. According to the battery failure determination device 20, although details will be described later, erroneous determination can be avoided. The battery failure determination device 20 of the present embodiment is provided in a vehicle, but is not limited thereto. It may be provided in a device on which a battery other than the vehicle is mounted.

In the present embodiment, the vehicles are Battery Electric Vehicle (BEV) that drive a motor (not shown) by using only the electric power of the battery for traveling. However, the vehicle may be a Hybrid Electric Vehicle (HEV) that drives a gasoline engine and a motor. Further, the vehicle of the present disclosure may be an engine vehicle that drives only a gasoline engine and travels.

The vehicle of the present embodiment has an automatic driving function. The automatic driving function is a function that allows an occupant to travel automatically without performing a driving operation. The autonomous driving function includes a function of supporting any one of acceleration, steering, and braking.

Power Source Circuit

The power source circuit 10 will be described with reference to FIG. 1.

The power source circuit 10 supplies electric power to the load 11 of the vehicle as described above. More specifically, when power is supplied through DCDC converter 14, the power source circuit 10 lowers or boosts the voltage outputted from the first battery 13 by DCDC converter 14 to supply power to the load 11, and also supplies power to the load 11 from the second battery 15. When power is supplied from only the first battery 13 to the load 11 without passing through the DCDC converter 14, the power source circuit 10 does not supply power from the second battery 15 to the load 11.

The load 11 is an electronic device provided in the vehicle. For example, the load 11 is an overall device that consumes power, such as an electrical component in a vehicle, a control device that controls the electrical component, a control device related to traveling, and a control device that controls automatic driving. The load 11 includes a load that operates only during manual operation, a load that operates only during automatic operation, and a load that operates both in manual operation and in automatic operation.

The first battery 13 is a lead battery and is a main power source of the load 11. The first battery 13 supplies electric power to the load 11 through either an electric path through the relay R or an electric path through the DCDC converter 14.

The DCDC converter 14 steps up or steps down the DC current supplied from the first battery 13 in accordance with the load 11. The DCDC converter 14 is provided on the electric path from the first battery 13 to the load 11, and is connected in parallel with the relay R to the load 11.

The second battery 15 is a lithium-ion battery and is an auxiliary power source for the load 11. The second battery 15 is connected in parallel with the first battery 13 with respect to the load 11.

In the power source circuit 10, the relay R is turned on during manual driving of the vehicle. Thus, the first battery 13 supplies electric power to the load 11 by an electric path passing through the relay R. At this time, since no current flows in the electric path of DCDC converter 14, DCDC converter 14 is not driven. Further, no electric power is supplied from the second battery 15 to the load 11.

On the other hand, during automatic driving of the vehicle, the relay R is turned off. As a result, since no current flows in the electric path passing through the relay R, the first battery 13 supplies electric power to the load 11 via the DCDC converter 14. At this time, the DCDC converter 14 steps up or steps down the power of the first battery 13 so as to have a voltage corresponding to the load 11. Electric power is also supplied from the second battery 15 to the load 11.

Battery Failure Determination Device

The battery failure determination device 20 will be described with reference to FIGS. 1 to 3.

As illustrated in FIG. 1, the battery failure determination device 20 determines a failure of the second battery 15 provided in the power source circuit 10 that supplies power to the load 11 of the vehicle. Although details will be described later, according to the battery failure determination device 20, erroneous determination can be avoided.

Figure 2:
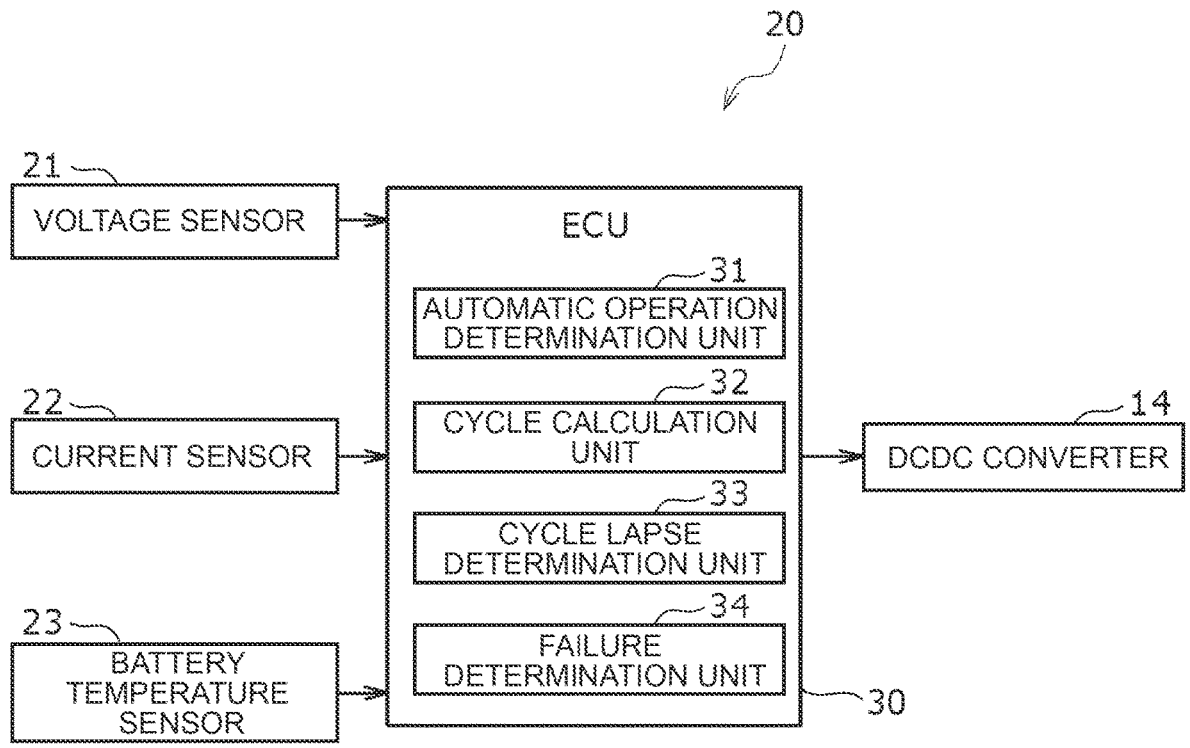
FIG. 2 is a block diagram illustrating a configuration of a control unit.

As illustrated in FIGS. 1 and 2, the battery failure determination device 20 includes a voltage sensor 21, a current sensor 22, a battery temperature sensor 23, and an Electronic Control Unit (ECU) 30 as a control unit. The voltage sensor 21, the current sensor 22, the battery temperature sensor 23, and ECU 30 will be described later.

The voltage sensor 21 detects an output voltage of DCDC converter 14. The voltage sensor 21 is provided between the DCDC converter 14 and the load 11. The current sensor 22 detects a discharge current of the second battery 15. The current sensor 22 is provided between the second battery 15 and the load 11. The battery temperature sensor 23 is a thermistor and detects the temperature of the second battery 15. The battery temperature sensor 23 is provided in the vicinity of the second battery 15.

ECU 30 determines a failure of the second battery 15 during autonomous driving of the vehicles. More specifically, as shown in FIG. 3, ECU 30 determines the failure of the second battery 15 based on whether or not the second battery 15 is discharged when the output voltage of the DCDC converter 14 is temporarily lowered during the autonomous driving of the vehicles.

ECU 30 has storage units such as Central Processing Unit (CPU), Random Access Memory (RAM), Read Only Memory (ROM), and the like, which are arithmetic processing units, and performs signal-processing in accordance with programs stored in advance in ROM while using RAM temporary storage functions.

As illustrated in FIG. 2, ECU 30 includes an autonomous driving determination unit 31, a cycle calculation unit 32, a cycle elapse determination unit 33, and a failure determination unit 34. Details of the autonomous driving determination unit 31, the cycle calculation unit 32, the cycle elapse determination unit 33, and the failure determination unit 34 will be described later. The autonomous driving determination unit 31, the cycle calculation unit 32, the cycle elapse determination unit 33, and the failure determination unit 34 are realized by CPU executing a program stored in a ROM or a RAM.

The autonomous driving determination unit 31 determines whether or not the vehicle is executing autonomous driving. Specifically, when the occupant sets the automatic driving mode by a setting switch or the like, it is determined that the vehicle is executing the automatic driving.

Figure 3:
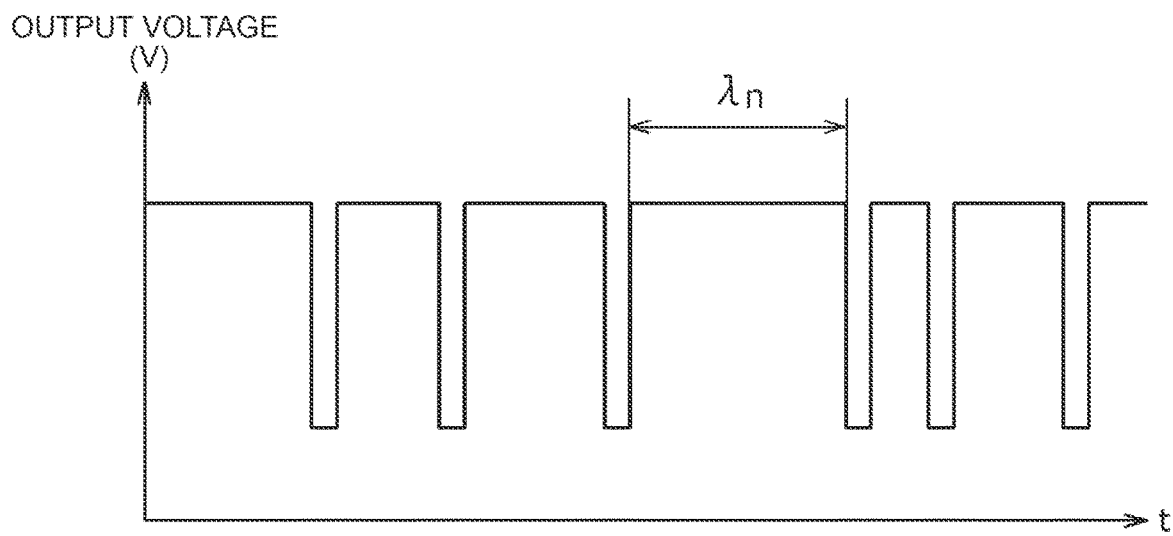
FIG. 3 is a graph showing time-series changes in the determination signal.

As illustrated in FIG. 3, the cycle calculation unit 32 calculates the cycle $\lambda_n$ so that the cycle $\lambda_n$ becomes irregular. The cycle $\lambda_n$ is a cycle for temporarily lowering the output voltage of the DCDC converter 14 when determining the failure of the above-described second battery 15. According to the cycle calculation unit 32, erroneous determination can be avoided by making the cycle $\lambda_n$ which temporarily lowers the output voltage of the DCDC converter 14 irregular.

Conventionally, when the failure of the second battery 15 is determined based on the presence or absence of discharging from the second battery 15 when the output voltage of DCDC converter 14 is temporarily lowered, the cycle of temporarily lowering the output voltage of DCDC converter 14 is constant.

The output voltage of the DCDC converter 14 cannot completely follow the fluctuations of loads such as noises or disturbances. Therefore, if a load-variation occurs when the output voltage of the DCDC converter 14 is lowered, the discharge from the second battery 15 also fluctuates. This may erroneously determine the failure of the second battery 15.

In the control of temporarily lowering the output voltage of the DCDC converter 14 at a constant cycle, when a load or a sensor operating at a constant cycle exists in the power source circuit 10, noises are generated at the cycle. Therefore, when the cycle of temporarily lowering the output voltage of the DCDC converter 14 and the cycle of the load-fluctuation are substantially synchronized in the failure determination, the discharging from the second battery 15 also fluctuates for each determination. This may lead to erroneous determination of the failure of the second battery 15.

The cycle calculation unit 32 sets a cycle $\lambda_n$ for temporarily lowering the output voltage of the DCDC converter 14 when determining the failure of the second battery 15 to irregular. According to the cycle calculation unit 32, it is possible to avoid the above-described erroneous determination without synchronizing with the cycle of the operation of the load or the sensor present in the power source circuit 10.

Specifically, the cycle calculation unit 32 calculates the cycle $\lambda_n$ using the following Expression (1).

$$\lambda_N = \lambda_{min} + \mathrm{mod}(R_n, (\lambda_{max} - \lambda_{min})) \quad (1)$$

In equation (1), $\lambda_{min}$ is the smallest cycle and is determined from the performance of ECU 30. The $\lambda_{max}$ is the largest cycle and is determined from a safety point of view. $R_n$ is a random value from 0 to 1. The $\mathrm{mod}(R_n, (\lambda_{max} - \lambda_{min}))$ is a modular function and represents the remainder of $R_n$ divided by the $\lambda_{max} - \lambda_{min}$. The remainder is smaller than $\lambda_{max} - \lambda_{min}$. In other words, Equation (1) is a value obtained by adding a random value smaller than $\lambda_{max} - \lambda_{min}$ to $\lambda_{min}$.

Further, the cycle calculation unit 32 calculates $R_1$ which is a cycle (first cycle) from the first determination to the second determination using the following Expression (2). Note that $R_0$, which is a cycle from when the power is turned on to the first determination, is a predetermined cycle.

$$R_1 = \mathrm{Rand}(\Sigma T_{batt}) \quad (2)$$

In Expression (2), $\Sigma T_{batt}$ is an integrated value of the battery temperature detected by the battery temperature sensor 23 in a certain time interval. Rand $(\Sigma T_{batt})$ is a random number when the seed value is $\Sigma T_{batt}$.

Here, a sensor such as a thermistor that transmits a detection value by a weak current, such as the battery temperature sensor 23, tends to be susceptible to noise such as disturbance. According to the cycle calculation unit 32, it is possible to reliably calculate an irregular initial cycle by using the detection value of the battery temperature sensor 23 that is likely to generate noise in the calculation of the initial cycle.

Further, the cycle calculation unit 32 calculates $R_2$ or later, which is a cycle from the second determination to the third determination, using the following Expression (3).

$$R_n = \mathrm{Rand}(R_{n-1}) \quad (3)$$

In Expression (3), Rand $(R_{n-1})$ is a random number when the seed value is set to $R_{n-1}$, which is the previous random value.

The cycle elapse determination unit 33 determines whether or not an irregular cycle calculated by the cycle calculation unit 32 has elapsed.

The failure determination unit 34 temporarily lowers the output voltage of the DCDC converter 14 (generates a detection-pulse). At this time, since the voltage of the second battery 15 is the highest, if the second battery 15 is normal, it is discharged from the second battery 15. Specifically, if a current value equal to or greater than a predetermined value is measured from the current sensor 22, it is determined that the second battery 15 is normal. On the other hand, if a current value equal to or greater than a predetermined value is not measured from the current sensor 22, the second battery 15 is determined to be abnormal.

Battery Failure Determination Control

Figure 4:
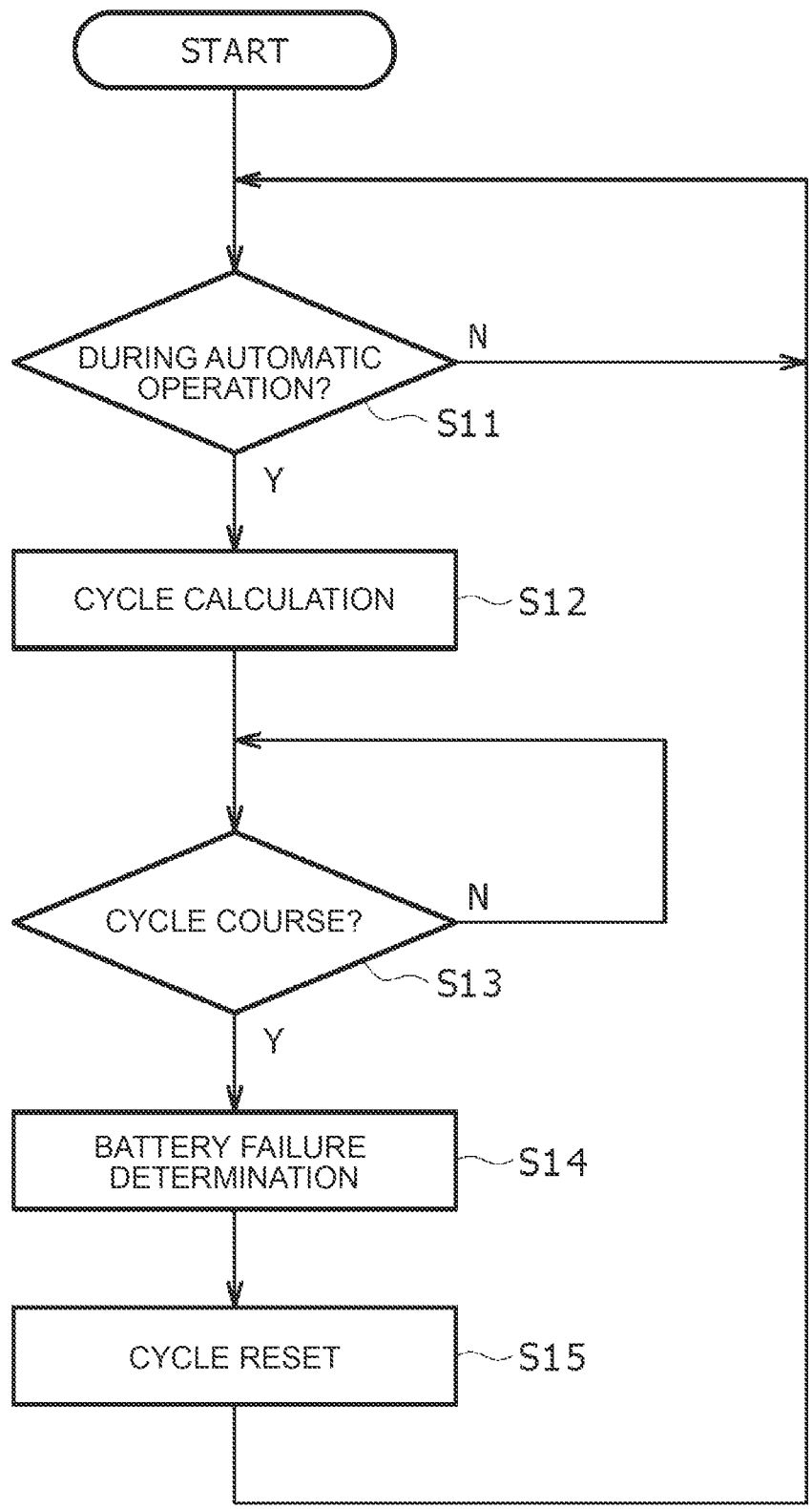
FIG. 4 is a flowchart illustrating a flow of failure determination control.

The flow of the battery failure determination control will be described with reference to FIG. 4.

In the battery failure determination control, the battery failure determination device 20 determines the presence or absence of a failure of the second battery 15 based on the functions of ECU 30 described above according to the following steps. In S11, the autonomous driving determination unit 31 determines whether or not the autonomous driving is executed. When the autonomous driving is executed, the control proceeds to S12.

In S12, the cycle calculation unit 32 calculates an irregular cycle in which the output voltage of the DCDC converter 14 is temporarily lowered. In S13, the cycle elapse determination unit 33 determines whether or not the calculated cycle has elapsed. If the cycle has elapsed, the process proceeds to S14.

In S14, the failure determination unit 34 temporarily lowers the output voltage of the DCDC converter 14 to detect the presence or absence of discharging from the second battery 15, and determines the failure of the second battery 15. In S15, the present cycle is reset.

It should be noted that the present disclosure is not limited to the above-described embodiments and variations thereof, and various modifications and improvements can be made within the scope of the matters described in the claims of the present application.

What is claimed is:

1. A battery failure determination device that determines a failure of a battery based on presence or absence of an electric discharge from the battery when an output voltage of a DCDC converter is temporarily lowered in a power source circuit in which electric power is supplied to a load by the battery and in which electric power is supplied to the load by a voltage stepped down or boosted by the DCDC converter from a power source different from the battery, wherein
a cycle of temporarily lowering the output voltage of the DCDC converter is irregular.

2. The battery failure determination device according to claim 1, wherein one of the cycles is determined using a battery temperature detected by a battery temperature sensor.

* * * * *